(12) United States Patent
Lee

(10) Patent No.: US 9,398,306 B2
(45) Date of Patent: Jul. 19, 2016

(54) ENTROPY ENCODING/DECODING METHOD AND APPARATUS FOR ACCELERATING VIDEO DECODING

(75) Inventor: Yun-gu Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1265 days.

(21) Appl. No.: 12/916,767

(22) Filed: Nov. 1, 2010

(65) Prior Publication Data

US 2011/0103469 A1    May 5, 2011

(30) Foreign Application Priority Data

Oct. 30, 2009    (KR) .................. 10-2009-0104426

(51) Int. Cl.
*H04N 19/436* (2014.01)
*H04N 19/61* (2014.01)
*H04N 19/91* (2014.01)

(52) U.S. Cl.
CPC ............. *H04N 19/436* (2014.11); *H04N 19/61* (2014.11); *H04N 19/91* (2014.11)

(58) Field of Classification Search
CPC .................. H04N 19/00521; H04N 19/00781; H04N 19/00121; H04N 19/00951
USPC .................................................. 375/240.03
See application file for complete search history.

(56) References Cited

U.S. PATENT DOCUMENTS

| 5,717,394 | A | 2/1998 | Schwartz et al. |
| 7,224,844 | B2 | 5/2007 | Otsuka |
| 8,582,656 | B2* | 11/2013 | Lin ...................... H04N 19/176 |
| | | | 375/240.18 |
| 2003/0219164 | A1* | 11/2003 | Otsuka ......................... 382/247 |
| 2009/0175349 | A1* | 7/2009 | Ye et al. ................... 375/240.23 |
| 2009/0279613 | A1* | 11/2009 | Suzumura ................ 375/240.25 |

FOREIGN PATENT DOCUMENTS

| JP | 2004-007555 A | 1/2004 |
| KR | 10-0240372 B1 | 1/2000 |
| KR | 10-2010-0138425 A | 12/2010 |

OTHER PUBLICATIONS

Communication issued Oct. 21, 2015, issued by the Korean Intellectual Property Office in counterpart Korean Patent Application No. 10-2009-0104426.
Communication dated Apr. 27, 2016, issued in counterpart Korean Application No. 10-2009-0104426.

* cited by examiner

*Primary Examiner* — Anner Holder
(74) *Attorney, Agent, or Firm* — Sughrue Mion, PLLC

(57) ABSTRACT

An entropy encoding method and apparatus implementing the same, the method including: generating bitstreams of data groups by performing entropy encoding on a plurality of symbols of the data groups and storing the bitstreams in a storage unit by allocating a plurality of divided segments of the storage unit according to properties of the bitstreams.

25 Claims, 6 Drawing Sheets

ENTROPY ENCODING/DECODING METHOD AND APPARATUS FOR ACCELERATING VIDEO DECODING

CROSS-REFERENCE TO RELATED PATENT APPLICATION

This application claims priority from Korean Patent Application No. 10-2009-0104426, filed on Oct. 30, 2009 in the Korean Intellectual Property Office, the disclosure of which is incorporated herein in its entirety by reference.

BACKGROUND

1. Field

Apparatuses and methods consistent with the exemplary embodiments relate to entropy encoding and decoding.

2. Description of the Related Art

Currently, high-resolution and high-quality video data are easily obtained due to the development of sensor systems. High-resolution and high-quality video data have large sizes and, thus, a video encoding or decoding technology is generally required to efficiently store the video data. Also, as the sizes of screens increase, a high-speed video encoding or decoding technology is demanded to process video data in real time.

A high-speed video encoding or decoding technology may be realized by processing a plurality of data groups in parallel. From among video decoding methods, an entropy decoding method may not be easily performed in parallel because symbols having a higher priority have to be decoded first in order to decode symbols having a lower priority.

SUMMARY

The exemplary embodiments provide an entropy encoding/decoding method and apparatus.

According to an aspect of an exemplary embodiment, there is provided an entropy encoding method including: generating a plurality of bitstreams of data groups by performing entropy encoding on a plurality of symbols of the data groups; and storing the bitstreams in a storage unit by allocating a plurality of divided segments of the storage unit according to respective properties of the plurality of bitstreams.

The storing the bitstreams may include allocating bitstreams of neighboring data groups in an encoding order of the data groups, to different segments among the plurality of divided segments.

The storing the bitstreams may include respectively allocating sequential first and second bitstreams in the encoding order of the data groups, to sequential first and second segments among the plurality of segments.

The storing the bitstreams may include, if a length of the first bitstream is less than a length of the first segment, allocating a next bitstream having a same property as the first bitstream, to the first segment from a point where the storing of the first bitstream is completed.

The storing the bitstreams may include, if a length of the second bitstream is greater than a length of the second segment, continuously allocating the second bitstream to one or more neighboring segments from the second segment.

The storing the bitstreams may include allocating a next bitstream of the second bitstream in the encoding order of the data groups, to a new segment that is not a segment in which the second bitstream is stored.

The respective properties of the bitstreams may be related to an encoding order of the data groups, and bitstreams of neighboring data groups in the encoding order of the data groups may have different properties.

A plurality of data groups may be classified according to the properties of the bitstreams.

A type of a segment may be determined according to a property of a bitstream allocated to the segment, and a number of types of the segments may correspond to a number of bitstreams that are entropy-decodable in parallel in one cycle.

According to an aspect of another exemplary embodiment, there is provided an entropy decoding method including: receiving a plurality of bitstreams of data groups, which are allocated to and stored in a plurality of segments of a storage unit; reading the plurality of bitstreams stored in an orderly manner in the plurality of segments according to properties of the plurality of bitstreams; and performing entropy decoding in parallel on the read bitstreams.

The reading the bitstreams may include reading bitstreams of neighboring data groups in a decoding order of the data groups, from different segments.

The reading the bitstreams may include respectively reading sequential first and second bitstreams, among the plurality of bitstreams, in the decoding order of the data groups, from sequential first and second segments, among the plurality of segments.

The reading the bitstreams may include, if a length of the first bitstream is less than a length of the first segment, reading a next bitstream having a same property as the first bitstream, from a point of the first segment where the storing of the first bitstream is completed.

The reading the bitstreams may include, if a length of the second bitstream is greater than a length of the second segment, continuously reading the second bitstream from one or more neighboring segments to the second segment, among the pluralit of segments.

The reading the bitstreams may include reading a next bitstream to the second bitstream in the encoding order of the data groups, from a new segment that is not a segment in which the second bitstream is stored.

The performing the entropy decoding in parallel may include performing entropy decoding in parallel on a number of bitstreams corresponding to a number of types of the segments in one cycle.

According to an aspect of another exemplary embodiment, there is provided an entropy encoding apparatus including: an entropy encoding performing unit which generates a plurality of bitstreams of data groups by performing entropy encoding on a plurality of symbols of the data groups; and a bitstream storage which stores the plurality of bitstreams in a storage unit by allocating a plurality of divided segments of the storage unit according to respective properties of the plurality of bitstreams.

According to an aspect of another exemplary embodiment, there is provided an entropy decoding apparatus including: a reception unit which receives a plurality of bitstreams of data groups, which are allocated to and stored in a plurality of segments of a storage unit; a bitstream read unit which reads the plurality of bitstreams stored in an orderly manner in the plurality of segments according to respective properties of the plurality of bitstreams; and an entropy decoding performing unit which performs entropy decoding in parallel on the read bitstreams.

According to an aspect of another exemplary embodiment, there is provided a computer readable recording medium having recorded thereon a computer program for executing the entropy encoding method.

According to an aspect of another exemplary embodiment, there is provided a computer readable recording medium having recorded thereon a computer program for executing the entropy decoding method.

BRIEF DESCRIPTION OF THE DRAWINGS

The above and other features and advantages will become more apparent by describing in detail exemplary embodiments thereof with reference to the attached drawings in which.

DETAILED DESCRIPTION OF THE EXEMPLARY EMBODIMENTS

Hereinafter, exemplary embodiments will be described in detail with reference to the attached drawings.

Figure 1:
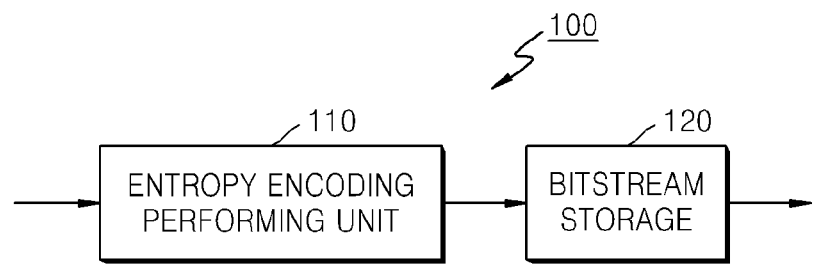
FIG. 1 is a block diagram of an entropy encoding apparatus, according to an exemplary embodiment.

FIG. 1 is a block diagram of an entropy encoding apparatus 100, according to an exemplary embodiment. Referring to FIG. 1, the entropy encoding apparatus 100 includes an entropy encoding performing unit 110 and a bitstream storage 120.

The entropy encoding performing unit 110 receives a plurality of symbols of data groups, performs entropy encoding, and, thus, generates bitstreams of the data groups.

A data group refers to a unit in which video data is encoded. An example of the data group may be a macroblock. However, the data group is not limited thereto.

The plurality of symbols input to the entropy encoding apparatus 100 are resultant data generated by a motion estimation unit which estimates motion between frames of input video data, a motion compensation unit which performs inter prediction by using motion information between the frames, an intra prediction unit which performs intra prediction by using information of neighboring pixels of one frame from among the frames, and a transformation and quantization unit which performs frequency transformation and quantization on residual video data generated by performing prediction encoding.

The symbols may include quantized coefficients of the residual video data of the data groups, encoding information, and the motion information. The encoding information may include information such as a prediction mode representing an encoding method and a size of a data group.

The entropy encoding may be performed by using a context-based adaptive variable-length coding (CAVLC) method, a context-based adaptive binary arithmetic coding (CABAC) method, or the like.

The bitstream storage 120 stores the bitstreams generated by the entropy encoding performing unit 110 in a storing space divided into a plurality of segments. The length of each of the plurality of segments is set in advance and the storing space is divided into equal-length segments. The bitstream storage 120 stores the bitstreams by allocating the bitstreams to respective segments according to properties of the bitstreams.

The properties of the bitstreams may be based on an encoding order of the data groups. Also, according to the properties of the bitstreams, the bitstreams may be classified into a plurality of groups. According to an exemplary embodiment, a type of a segment is determined based on a property of a bitstream allocated to the segment and, thus, the storing space may be divided into the plurality of segments corresponding to a plurality of types. A number of types of the plurality of segments may correspond to a number of bitstreams that are entropy-decodable in parallel in one cycle.

The bitstream storage 120 determines that bitstreams of neighboring data groups in the encoding order of the data groups have different properties, and thus does not allocate bitstreams of neighboring data groups to the same segment. In other words, the bitstream storage 120 allocates bitstreams of neighboring data groups in the encoding order of the data groups to different segments among the plurality of segments.

The bitstream storage 120 may search for a segment to which a bitstream is allocated. When a segment to which a bitstream of a predetermined data group is searched, if a bitstream of a data group having a neighboring processing order is stored in a currently used segment, the bitstream of the predetermined data group may be allocated to a new segment that is not currently used.

In more detail, the bitstream storage 120 may respectively allocate sequential first and second bitstreams in the encoding order of the data groups, to sequential first and second segments among the plurality of segments.

If a length of the first bitstream is less than that of the first segment, a next bitstream having the same property as the first bitstream may be allocated to the first segment from a point where the storing of the first bitstream is completed.

Also, if a length of the second bitstream is greater than that of the second segment, the second bitstream may be continuously allocated to a plurality of neighboring segments from the second segment, among the plurality of segments. In this case, a next bitstream of the second bitstream in the encoding order of the data groups may be allocated to a new segment that is not a segment in which the storing of the second bitstream is completed, among the plurality of segments.

The bitstream storage 120 may reconfigure the order of the bitstreams to be stored or output.

The entropy encoding apparatus 100 reconfigures a storing order of bitstreams generated based on data groups by performing entropy encoding and outputs the bitstreams such that a decoding terminal may entropy-decode the bitstreams in parallel. Accordingly, when video data having a resolution of a high-definition (HD) or an ultra-definition (UD) level is encoded/decoded, entropy decoding may be performed at high speed.

Figure 2:
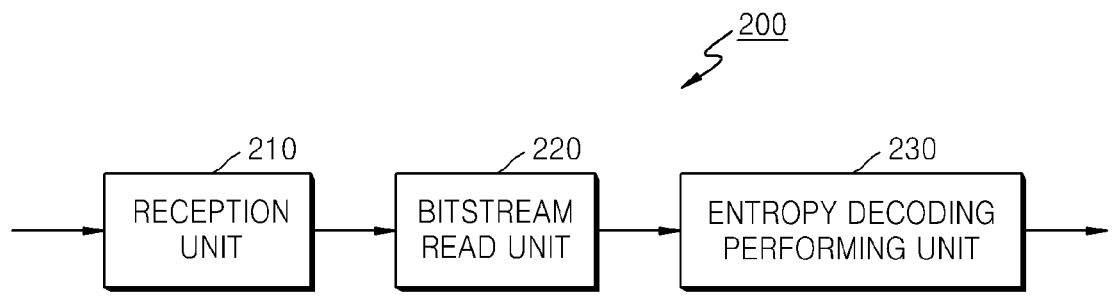
FIG. 2 is a block diagram of an entropy decoding apparatus, according to an exemplary embodiment.

FIG. 2 is a block diagram of an entropy decoding apparatus 200, according to an exemplary embodiment. Referring to FIG. 2, the entropy decoding apparatus 200 includes a reception unit 210, a bitstream read unit 220, and an entropy decoding performing unit 230.

The reception unit 210 may receive a plurality of entropy-encoded bitstreams of data groups. A storing order of the received bitstreams is reconfigured according to the data groups. For example, bitstreams of sequential data groups in the decoding order of the data groups are not sequentially stored. Accordingly, the reading order of bitstreams of the data groups may be determined in consideration of a decoding order of the data groups.

The bitstream read unit 220 reads the bitstreams received by the reception unit 210 by identifying the bitstreams. Since the bitstreams are stored in an orderly manner in segments divided according to properties of the bitstreams, the bitstream read unit 220 searches for a segment to which a desired bitstream is allocated, in order to read the desired bitstreams.

The bitstream read unit 220 reads bitstreams of neighboring data groups in the decoding order of the data groups, from different segments. In more detail, the bitstream read unit 220 reads sequential first and second bitstreams in the decoding order of the data groups from sequential first and second segments. If the length of the first bitstream is less than that of the first segment, a next bitstream having the same property as the first bitstream may be read from the first segment from a point where the storing of the first bitstream is completed.

Also, if the length of the second bitstream is greater than that of the second segment, the second bitstream may be continuously read from a plurality of segments, including the second segment and neighboring segments from the second segment. In this case, a next bitstream of the second bitstream in the encoding order of the data groups may be read from a new segment that is not the segment in which the storing of the second bitstream is completed.

The entropy decoding performing unit 230 performs entropy decoding in parallel on the bitstreams read by the bitstream read unit 220. The entropy decoding performing unit 230 may perform entropy decoding in parallel on a number of bitstreams corresponding to a number of types of the segments in one cycle. For example, if the bitstreams are allocated to N number of segments according to the properties of the bitstreams, the entropy decoding performing unit 230 may perform parallel processing on the N number of segments.

Symbols of the data groups, which are generated when the entropy decoding performing unit 230 performs entropy decoding, may include quantized coefficients of residual video data of the data groups, encoding information and motion information.

The entropy decoding apparatus 200 may further include an inverse quantization and inverse transformation unit (not shown) which restores video data of the data groups by performing inverse quantization and inverse frequency transformation on the quantized coefficients of the residual video data of the data groups, a motion compensation unit (not shown) which performs inter prediction by using the motion information and the residual video data of the data groups, an intra prediction unit (not shown) which performs intra prediction on the video data of the data groups, and a deblocking performing unit (not shown) which restores original video data by performing deblocking filtering on the video data of the data groups and the video data on which the intra prediction and motion compensation are performed. The symbols may be decoded by the inverse quantization and inverse transformation unit, a motion estimation unit, the motion compensation unit, the intra prediction unit and the deblocking performing unit into the original video data.

The entropy decoding apparatus 200 may receive a plurality of bitstreams of data groups, which are generated by performing entropy encoding and of which a storing order is reconfigured, and may perform entropy decoding in parallel on the bitstreams of the data groups. Accordingly, entropy decoding may be performed at high speed on video data having a resolution of an HD or a UD level. An overall speed of video decoding may be increased by performing entropy decoding at high speed.

Figure 3:
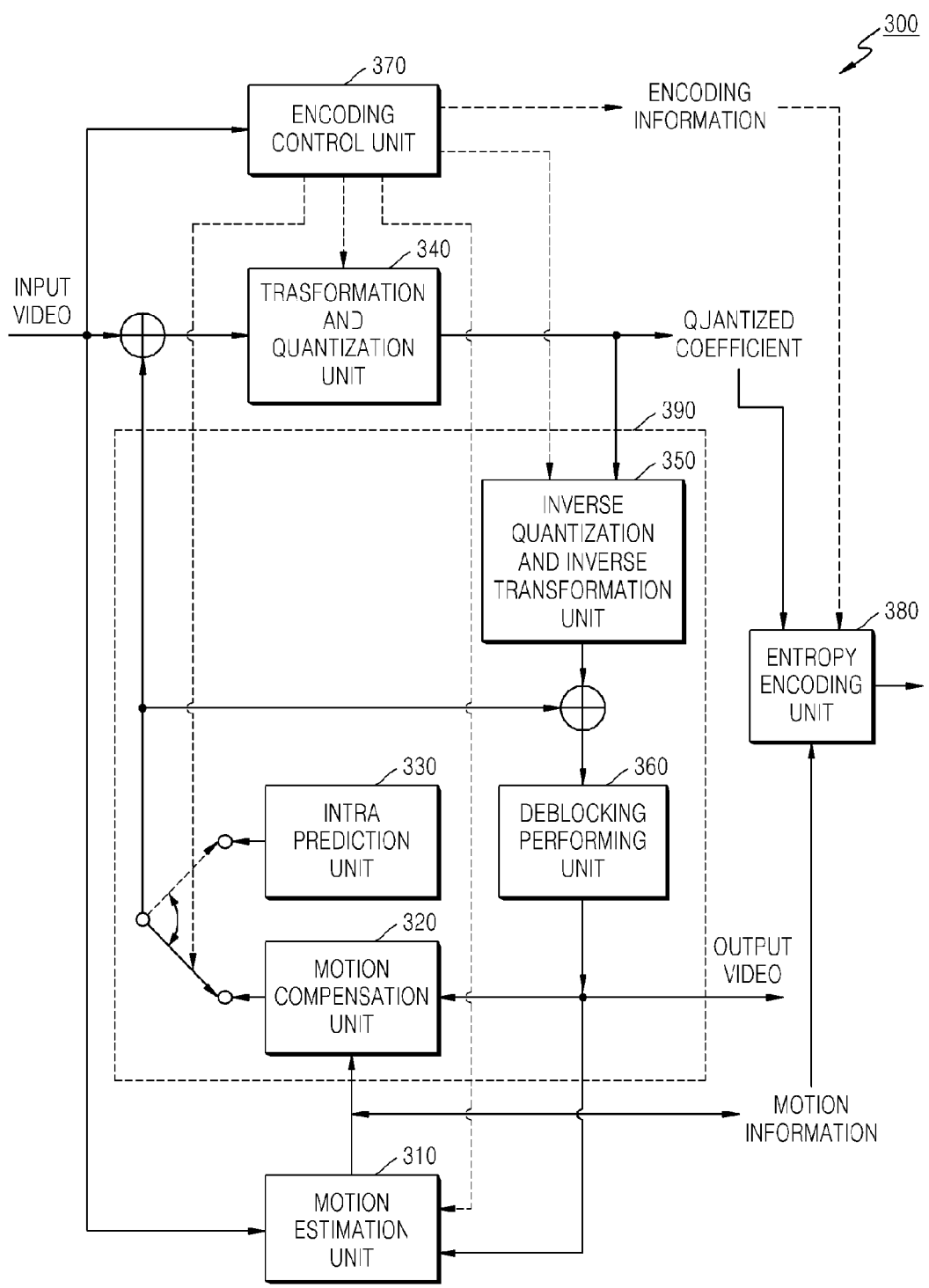
FIG. 3 is a block diagram of an H.264 system according to an exemplary embodiment.

FIG. 3 is a block diagram of an H.264 system according to an exemplary embodiment. Referring to FIG. 3, a video encoding module 300 of the H.264 system includes a motion estimation unit 310, a motion compensation unit 320, an intra prediction unit 330, a transformation and quantization unit 340, an inverse quantization and inverse transformation unit 350, a deblocking performing unit 360, an encoding control unit 370, and an entropy encoding unit 380.

The motion estimation unit 310 estimates motion between frames of input video data. Then, the motion compensation unit 320 which performs inter prediction between the frames by using motion information and the intra prediction unit 330 which performs intra prediction by using information of neighboring pixels of one frame selectively operate by control of the encoding control unit 370. The transformation and quantization unit 340 performs frequency transformation and quantization on the input video data and residual video data generated by performing prediction encoding, and the entropy encoding unit 380 encodes quantized coefficients into a bitstream having high transmission efficiency.

The inverse quantization and inverse transformation unit 350 generates residual video data by restoring the quantized coefficients into spatial domain data, and restoration video data is generated by reflecting the prediction encoding result to the residual video data. The deblocking performing unit 360 generates output video data by performing quantization and transformation in units of a block so as to reduce a blocking effect of the restoration video data.

The encoding control unit 370 controls the encoding process overall. For example, the encoding control unit 370 may output, as encoding information, information for controlling the transformation and quantization unit 340 and the inverse quantization and inverse transformation unit 350 and information for controlling the motion estimation unit 310.

The motion information generated by the motion estimation unit 310, the quantized coefficients of the residual video data which are generated by the transformation and quantization unit 340, and the various types of encoding information output from the encoding control unit 370 are output from the entropy encoding unit 380 in the form of a bitstream that is closest to an entropy state.

A decoding process of the H.264 system may be performed by a video decoding unit 390 including the inverse quantization and inverse transformation unit 350, the deblocking performing unit 360, the motion compensation unit 320 and the intra prediction unit 330. Entropy-decoded symbols of a received bitstream are input to the inverse quantization and inverse transformation unit 350. The deblocking performing unit 360 generates output video data by reducing a blocking effect, as decoded ultimate video data.

If the entropy encoding apparatus 100 illustrated in FIG. 1 uses an H.264 encoding method, the entropy encoding apparatus 100 may be used as the entropy encoding unit 380. Also, if the entropy decoding apparatus 200 illustrated in FIG. 2 uses an H.264 decoding method, symbols entropy-decoded in parallel may be decoded by the video decoding unit 390.

However, it is understood that encoding/decoding methods of the entropy encoding apparatus 100 and the entropy decoding apparatus 200 are not limited to the H.264 encoding/decoding methods in other exemplary embodiments.

Figure 4:
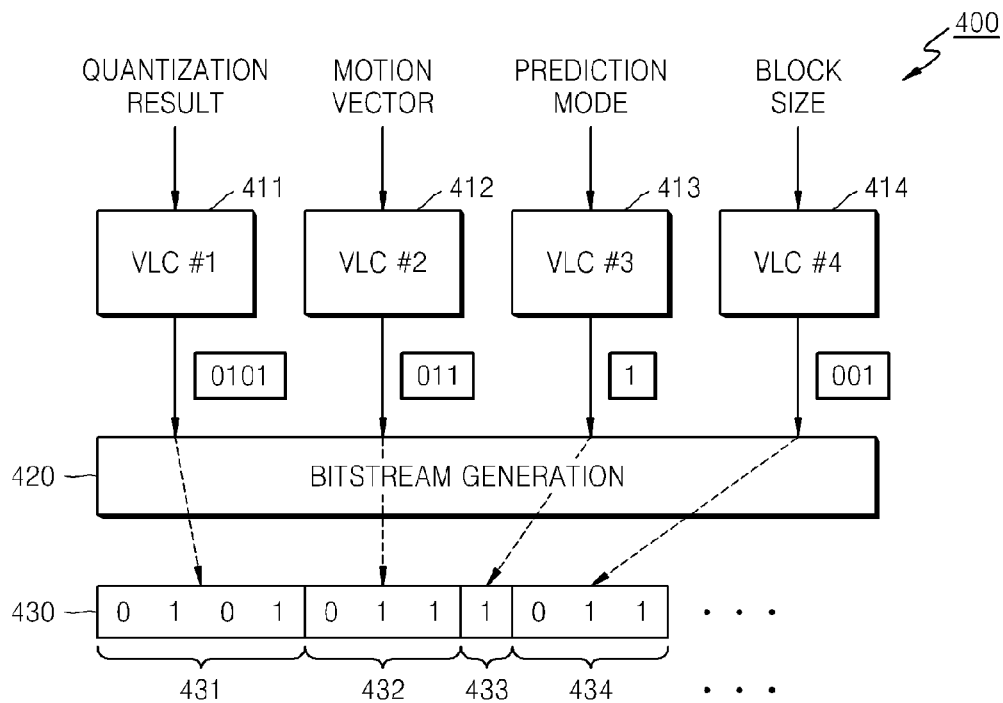
FIG. 4 is a diagram for describing an entropy encoding process in parallel.

FIG. 4 is a diagram for describing an entropy encoding process 400 in parallel. Referring to FIG. 4, the entropy encoding process 400 uses a variable-length coding (VLC)

method. A quantization result of residual video data, a motion vector, a prediction mode and block size information may be entropy-encoded in parallel respectively by first through fourth VLC units 411 through 414. For example, the quantization result of the residual video data may be information regarding a level and a run value, the prediction mode may represent an intra mode, an inter mode, a skip mode or the like, and the block size information may represent a block size such as 4×4, 8×8 or 16×16.

The first VLC unit 411 may generate a first bitstream 431 ('0101'), the second VLC unit 412 may generate a second bitstream 432 ('011'), the third VLC unit 413 may generate a third bitstream 433 ('1'), and the fourth VLC unit 414 may generate a fourth bitstream 434 ('001'). Since the first through fourth VLC units 411 through 414 may perform entropy encoding in parallel, the bitstreams 431 through 434 may be generated in the same cycle.

The bitstreams 431 through 434 respectively generated by the first through fourth VLC units 411 through 414 are formed into one bitstream 430 ('01010111011') by performing a bitstream generation process 420.

Accordingly, since different types of resultant data of one data group may be processed in parallel, bitstreams according to data types of one data group may be simultaneously generated in one cycle. Also, in the entropy encoding process 400, since the sizes of the bitstreams 431 through 434 respectively generated by the first through fourth VLC units 411 through 414 may be known, the bitstreams 431 through 434 generated according to input data may be arranged in a predetermined order and then may be simultaneously generated into an output bitstream in the bitstream generation process 420.

Figure 5:
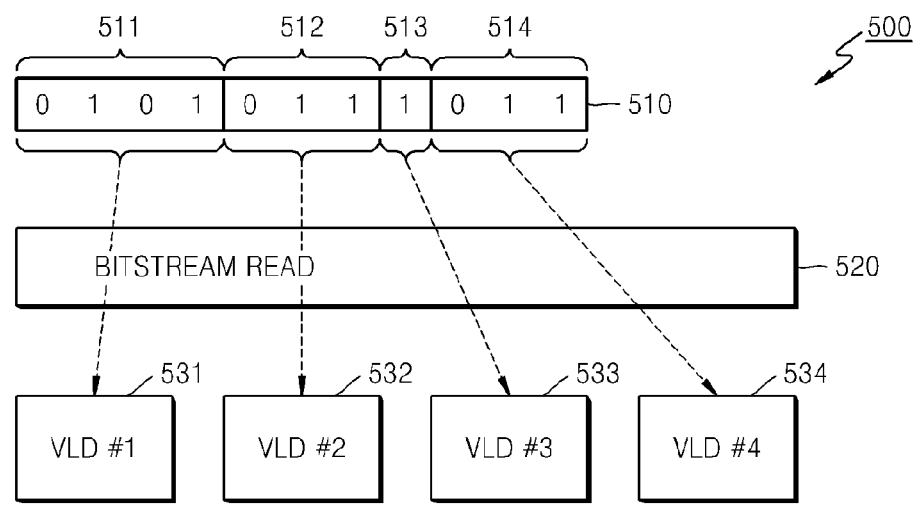
FIG. 5 is a diagram for describing an entropy decoding process in parallel.

FIG. 5 is a diagram for describing an entropy decoding process 500 in parallel. Referring to FIG. 5, in the entropy decoding process 500, although a received bitstream 510 includes first through fourth bitstreams 511 through 514 having different types of information, unless a first bitstream 511 having a higher priority is read and then is entropy-decoded by a first variable-length decoding (VLD) unit 531 in a bitstream read process 520, second through fourth bitstreams 512 through 514 having lower priorities may not be read. Accordingly, the first through fourth bitstreams 511 through 514 may not be easily read in parallel.

As such, entropy decoding of the first VLD unit 531 and entropy decoding of second through fourth VLD units 532 through 534 may not be performed in parallel.

Accordingly, although entropy encoding may be performed in parallel on one data group having different data types, in an entropy decoding process, a start point where bitstreams having lower priorities are stored may not be easily found and thus parallel processing may not be easily performed.

Figure 6:
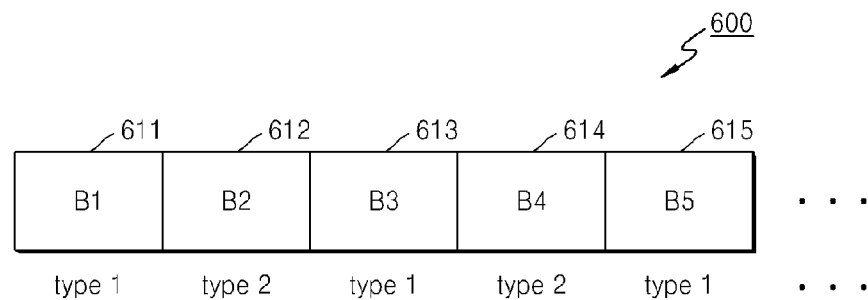
FIG. 6 is a conceptual diagram for describing a method of dividing a storing space into segments based on bitstreams of data groups, according to an exemplary embodiment.

FIG. 6 is a conceptual diagram for describing a method of dividing a storing space into segments based on bitstreams of data groups, according to an exemplary embodiment. Referring to FIG. 6, an entropy-encoded bitstream 600 includes first through fifth bitstreams 611 through 615 of data groups. For example, if a storing space of the entropy-encoded bitstream 600 is divided into two-type segments, properties of the first through fifth bitstreams 611 through 615 may be classified into two types. Bitstreams of different-type data groups may be allocated to different-type segments.

The entropy encoding apparatus 100 illustrated in FIG. 1 may use an encoding or decoding order of the data groups (hereinafter, the encoding order will be representatively described) as properties of the first through fifth bitstreams 611 through 615 to determine a reconfiguration order of the first through fifth bitstream 611 through 615. If the storing space is divided into two-type segments, the encoding order of the data groups may be classified into two types. For example, the bitstream 600 may classify the encoding order of the data groups into odd-number and even-number processing orders of the data groups.

B1 through B5 represent the encoding order of the data groups. Accordingly, the first, third, and fifth bitstreams 611, 613 and 615 may be classified as first-type bitstreams and the second and fourth bitstreams 612, 614 and 616 may be classified as second-type bitstreams. The bitstream storage 120 illustrated in FIG. 1 may allocate the first-type bitstreams to first-type segments, and the second-type bitstreams to second-type segments. Also, the bitstream read unit 220 illustrated in FIG. 2 may read the first-type bitstreams from the first-type segments, and the second-type bitstreams from the second-type segments.

FIGS. 7A through 7D are conceptual diagrams showing that bitstreams of data groups are allocated in an orderly manner to a storing space divided into segments, according to an exemplary embodiment. FIGS. 7A through 7D shows how the bitstream storage 120 illustrated in FIG. 1 reconfigures and stores entropy-encoded bitstreams of data groups. Also, the bitstream read unit 220 illustrated in FIG. 2 may identify bitstreams of data groups from a received bitstream and may read the bitstreams in an encoding order, as illustrated in FIG. 7A through 7D.

Figure 7A:
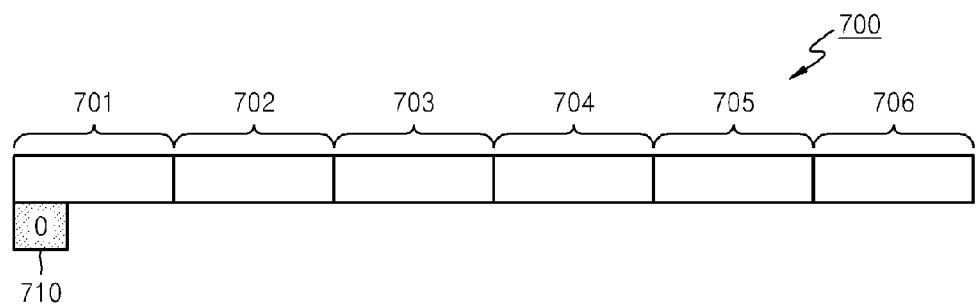
FIGS. 7A through 7D are conceptual diagrams showing that bitstreams of data groups are allocated in an orderly manner to a storing space divided into segments, according to an exemplary embodiment.

Referring to FIG. 7A, a storing space 700 is divided into first through sixth segments 701 through 706. Properties of bitstreams of data groups may be classified into a first property of bitstreams of data groups having even order numbers and a second property of bitstreams of data groups having odd order numbers, in an encoding order of the data groups. A first bitstream 710 of a data group having order number 0, i.e., an initial bitstream, may be allocated to the first segment 701. The first segment 701 to which the bitstream 710 having the first property is allocated may be classified as a first-type segment.

Figure 7B:
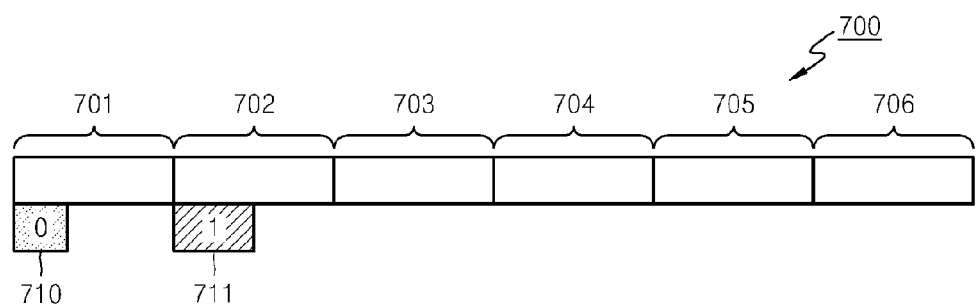

Referring to FIG. 7B, a second bitstream 711 of a data group having order number 1 is a bitstream of a neighboring data group of the data group of the first bitstream 710 according to the encoding order of the data groups, and thus may not be allocated to the first segment 701 to which the first bitstream 710 is allocated. Accordingly, the second bitstream 711 may be allocated to the second segment 702. The second segment 702 to which the second bitstream 711 having the second property is allocated may be classified as a second-type segment.

If the entropy decoding performing unit 230 illustrated in FIG. 2 includes first and second entropy decoding units, the first entropy decoding unit may perform entropy decoding on bitstreams having the first property, and the second entropy decoding unit may perform entropy decoding on bitstreams having the second property in parallel with the first entropy decoding unit.

Figure 7C:
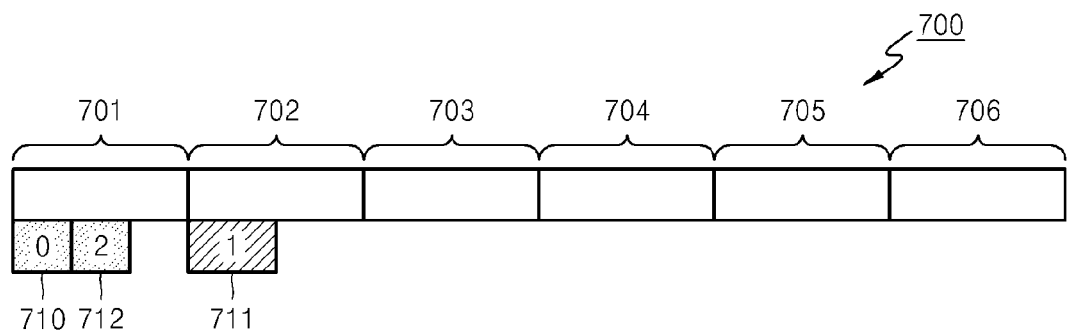

Referring to FIG. 7C, a third bitstream 712 of a data group having order number 2 is a bitstream of a data group having the first property, like the first bitstream 710, and thus may be allocated to the same-type segment as that to which the first bitstream 710 is allocated (i.e., the first segment 701). Furthermore, since the first segment 701 has a remaining space in addition to the storing space of the first bitstream 710, the third bitstream 712 may be allocated to the first segment 701.

In this case, since the first and third bitstreams 710 and 712 are adjacent to each other, before the second entropy decoding unit completes the entropy decoding of the second bitstream 711 having the second property, the first entropy decoding unit may entropy-decode both the first and third bitstreams 710 and 712.

Figure 7D:
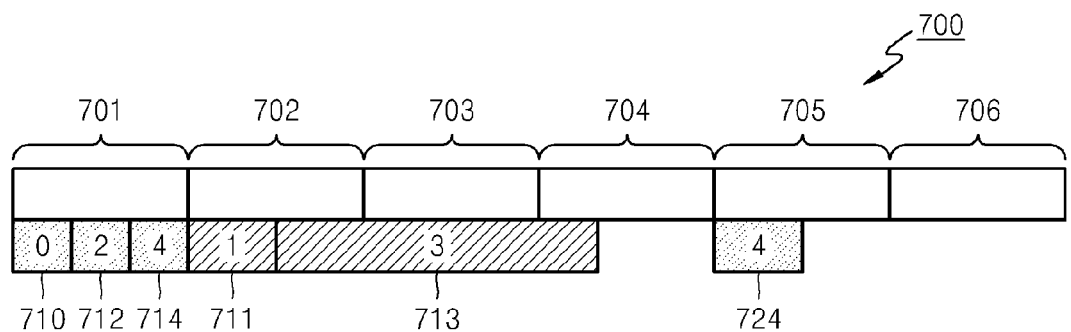

Referring to FIG. 7D, a fourth bitstream 713 of a data group having order number 3 is a bitstream of a data group having the second property, and thus may be allocated to the same-type segment as that to which the second bitstream 711 having the second property is allocated (i.e., the second segment 702). Furthermore, since the second segment 702 has a remaining space in addition to the storing space of the second bitstream 711, the fourth bitstream 713 may be allocated to the second segment 702. However, since the length of the fourth bitstream 713 is greater than that of the remaining space of the second segment 702, the fourth bitstream 713 may be continuously allocated to the neighboring third and fourth segments 703 and 704. The third and fourth segments 703 and 704 to which the fourth bitstream 713 having the second property is allocated may be classified as second-type segments.

A bitstream of a data group having order number 4 is a bitstream of a data group having the first property, and thus may be allocated to the same-type segment as that to which the first and third bitstreams 710 and 712 having the first property are allocated. Furthermore, since the first segment 701 has a remaining space in addition to the storing space of the first and third bitstreams 710 and 712, a partial fifth bitstream 714 of the bitstream of the data group having order number 4 may be allocated to the first segment 701. However, since the length of the bitstream of the data group having order number 4 is greater than that of the remaining space of the first segment 701, a remaining fifth bitstream 724 of the bitstream of the data group having order number 4 is allocated to a new segment, i.e., the fifth segment 705.

In this case, since the second through fourth segments 702 through 704 are second-type segments, a bitstream having the first property may not be allocated thereto. Accordingly, the remaining fifth bitstream 724 may be allocated to the fifth segment 705 that is the closest segment to the first segment 701, i.e., a first-type segment, from among segments that are not classified as second-type segments.

In this manner, the bitstream storage 120 illustrated in FIG. 1 may allocate bitstreams having the first property and bitstreams having the second property to different-type segments. As such, the bitstream read unit 220 illustrated in FIG. 2 may read the bitstreams having the first property from first-type segments, and the bitstreams having the second property from second-type segments.

Also, before knowing that the storing of the fourth bitstream 713 is completed in the fourth segment 704, it may not be identified (e.g., by the bitstream storage 120) that a segment to which the remaining fifth bitstream 724 of the bitstream of the data group having order number 4 is the fifth segment 705. In other words, before the fourth bitstream 713 having a higher priority is read according to a decoding order, a location from which the remaining fifth bitstream 724 having a lower priority is read may not be determined.

Accordingly, although the first bitstream 710 having the first property and the second bitstream 711 having the second property may be processed in the same cycle and the third bitstream 712 having the first property and the fourth bitstream 713 having the second property may be processed in the same cycle according to a parallel entropy decoding order, before a cycle for processing the fourth bitstream 713 having the second property is terminated, entropy decoding of the bitstream of the data group having order number 4, which has the first property, may not be completed.

When the first entropy decoding unit performs entropy decoding on the third bitstream 712 of the data group having order number 2 and the second entropy decoding unit performs entropy decoding on the fourth bitstream 713 of the data group having order number 3 in parallel, if the processing of the third bitstream 712 is completed first, although the processing of the fourth bitstream 713 by the second entropy decoding unit is not completed, the first entropy decoding unit may start to process the bitstream of the data group having order number 4. In this case, although the processing of the fourth bitstream 713 is not completed, the partial fifth bitstream 714 of the bitstream of the data group having order number 4 may be read and entropy-decoded. However, since the location from which the remaining fifth bitstream 724 of the bitstream of the data group having order number 4 is read is not determined, the entropy decoding of the bitstream of the data group having order number 4 may be paused until the processing of the fourth bitstream 713 is completed in an exemplary embodiment.

Alternatively, in another exemplary embodiment, when the first entropy decoding unit performs entropy decoding on the third bitstream 712 of the data group having order number 2 and the second entropy decoding unit performs entropy decoding on the fourth bitstream 713 of the data group having order number 3 in parallel, although the processing of the third bitstream 712 is completed first, the first entropy decoding unit may be set in advance not to start to process the bitstream of the data group having order number 4 until the processing of the fourth bitstream 713 is completed.

Although two-type bitstreams are allocated to two-type segments in FIGS. 6 and 7A through 7D, it is understood that another exemplary embodiment is not limited thereto. For example, in another exemplary embodiment, the entropy encoding apparatus 100 and the entropy decoding apparatus 200 allow entropy decoding to be performed in parallel on N number of bitstreams allocated to N-type segments (where N is a natural number equal to or greater than three). In this case, bitstreams of data groups having order numbers that increase by N may be allocated to one segment.

Figure 8:
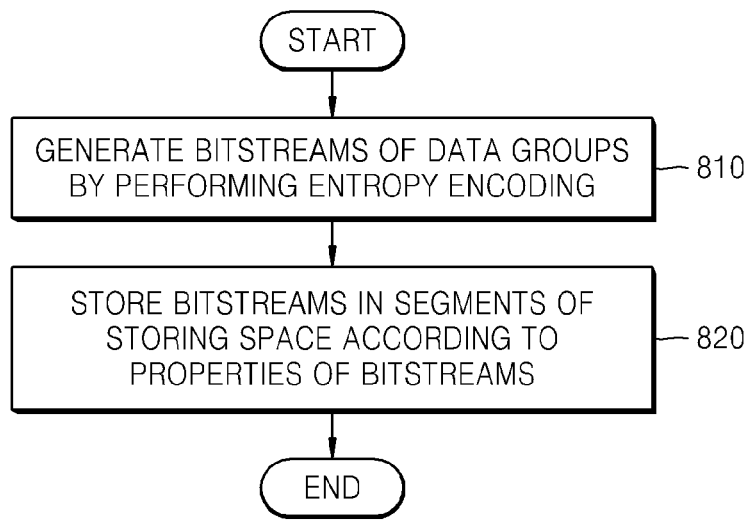
FIG. 8 is a flowchart of an entropy encoding method, according to an exemplary embodiment.

FIG. 8 is a flowchart of an entropy encoding method, according to an exemplary embodiment. Referring to FIG. 8, in operation 810, bitstreams of data groups are generated by performing entropy encoding on a plurality of symbols of data groups.

In operation 820, the generated bitstreams are allocated to and stored in a plurality of divided segments of a storing space of the bitstreams, according to properties of the bitstreams. Bitstreams of neighboring data groups in an encoding order of the data groups are allocated to different segments.

The properties of the bitstreams are related to the encoding order of the data groups, and bitstreams of neighboring data groups in the encoding order of the data groups may have different properties. The bitstreams may be classified into a plurality of data groups according to the properties of the bitstreams. The type of a segment is classified according to a property of a bitstream allocated to the segment, and the number of types of the segments corresponds to the number of bitstreams that may be entropy-decoded in parallel in one cycle.

Figure 9:
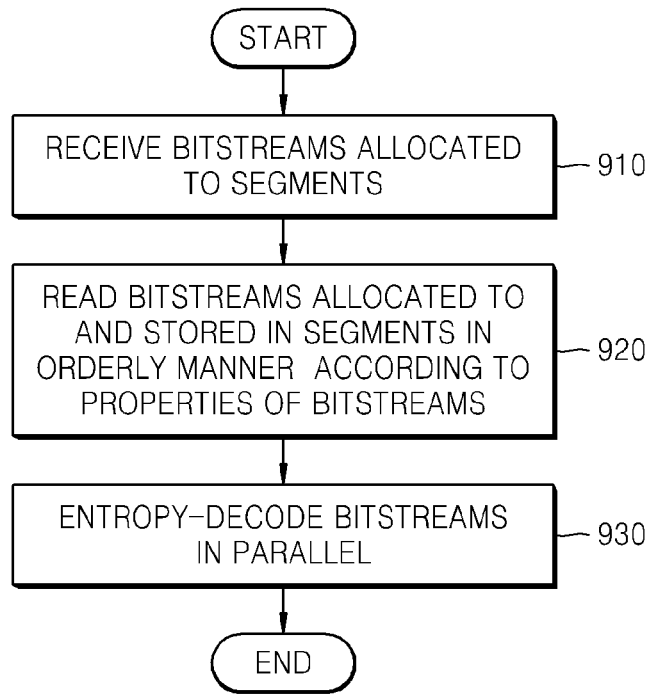
FIG. 9 is a flowchart of an entropy decoding method, according to an exemplary embodiment.

FIG. 9 is a flowchart of an entropy decoding method, according to an exemplary embodiment. Referring to FIG. 9, in operation 910, a plurality of bitstreams of data groups, which are allocated to a plurality of segments, are received. A storing order of the received bitstreams is reconfigured according to the data groups. The reading order of the bitstreams may be determined in consideration of a decoding order of the data groups.

In operation 920, the bitstreams allocated in an orderly manner to the segments according to properties of the bitstreams are read. Bitstreams of neighboring data groups in the decoding order of the data groups may be read from different segments.

In operation 930, the read bitstreams are entropy-decoded in parallel. In every parallel processing cycle, a number of bitstreams corresponding to the number of types of the segments may be entropy-decoded in parallel. For example, if the bitstreams are allocated to N-type segments according to the properties of the bitstreams, entropy decoding may be performed in parallel on N number of segments in one cycle, where N is a natural number greater than or equal to 2.

According to an exemplary embodiment, a storing order of bitstreams generated by performing entropy encoding is reconfigured according to data groups. An entropy decoding apparatus may perform entropy decoding in parallel on a plurality of bitstreams of data groups by reading the bitstreams in a parallel entropy decoding order. Accordingly, entropy decoding may be performed at a high speed on video data having a resolution of an HD or UD level.

It is understood that exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc. Aspects may also be realized as a data signal embodied in a carrier wave and including a program readable by a computer and transmittable over the Internet. Moreover, while not required in all exemplary, one or more of the above-described units can include a processor or microprocessor executing a computer program stored in a computer-readable medium.

While the present inventive concept has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the exemplary embodiments, but by the following claims, and all differences within the scope will be construed as being included in the present invention.

What is claimed is:

1. An entropy encoding method comprising:
generating a plurality of bitstreams of data groups by performing entropy encoding on a plurality of symbols of the data groups; and
storing a first bitstream among the plurality of bitstreams in a first segment, among a plurality of divided segments of a storage unit, according to a first property of the first bitstream, and storing a second bitstream among the plurality of bitstreams in a second segment, among the plurality of divided segments, according to a second property of the second bitstream,
wherein the storing of the first and the second bitstreams comprises allocating the first and the second bitstreams of neighboring data groups in an encoding order of the data groups, to the first and the second segments,
wherein the plurality of bitstreams are stored such that the first bitstream and the second bitstream are stored in different segments, among the plurality of divided segments, when the first bitstream and the second bitstream are adjacent to each other according to the encoding order of the data groups,
wherein the first and the second segments are sequential in the plurality of divided segments, and
wherein the storing the first and the second bitstreams comprises, if a length of the first bitstream is less than a length of the first segment, allocating a third bitstream having the first property to the first segment from a point where the storing of the first bitstream is completed.

2. The method of claim 1, wherein the storing the first and the second bitstreams comprises, if a length of the second bitstream is greater than a length of the second segment, continuously allocating the second bitstream to one or more neighboring segments to the second segment, among the plurality of divided segments.

3. The method of claim 2, wherein the storing the first and the second bitstreams further comprises allocating a third bitstream having the first property or a third property, to a third segment that is not the second segment and is not the one or more neighboring segments from the second segment, among the plurality of divided segments.

4. The method of claim 1, wherein:
the first and the second properties correspond to an encoding order of the data groups; and
bitstreams of neighboring data groups in the encoding order of the data groups have different properties.

5. The method of claim 1, wherein the data groups are classified according to properties of the plurality of bitstreams.

6. The method of claim 5, wherein:
a type of a segment, among the plurality of divided segments, is determined according to a property of a bitstream allocated to the segment; and
a number of types of the plurality of divided segments corresponds to a number of bitstreams that are entropy-decodable in parallel in one cycle.

7. An entropy decoding method comprising:
receiving a plurality of bitstreams of data groups, which are allocated to and stored in a plurality of segments of a storage unit;
reading first and second bitstreams, of the plurality of bitstreams, stored in an orderly manner in first and second segments, respectively, of the plurality of segments according to first and second properties, respectively, of the first and the second bitstreams; and
performing entropy decoding in parallel on the read first and second bitstreams,
wherein the reading the first and the second bitstreams comprises reading the first and the second bitstreams of neighboring data groups in a decoding order of the data groups, from the first and the second segments,
wherein the first bitstream and the second bitstream are read from different segments, among the plurality of divided segments, when the first bitstream and the second bitstream are adjacent to each other according to the decoding order of the data groups,
wherein the reading the first and the second bitstreams comprises respectively reading the first and the second bitstreams that are sequential in the decoding order of the data groups, from the first and the second segments that are sequential in the plurality of segments, and
wherein the reading the first and the second bitstream comprises, if a length of the first bitstream is less than a length of the first segment, reading a third bitstream having the first property, from the first segment at a point where the storing of the first bitstream is completed.

8. The method of claim 7, wherein the reading the first and the second bitstreams comprises, if a length of the second bitstream is greater than a length of the second segment, continuously reading the second bitstream from one or more neighboring segments to the second segment among the plurality of segments.

9. The method of claim 8, wherein the reading the first and the second bitstreams comprises reading a third bitstream having the first property or a third property, from a third segment that is not the second segment and is not the one or more neighboring segments, from among the plurality of segments.

10. The method of claim 7, wherein:
the first and the second properties correspond to a decoding order of the data groups; and
bitstreams of neighboring data groups in the decoding order of the data groups have different properties.

11. The method of claim 7, wherein data groups are classified according to properties of the plurality of bitstreams.

12. The method of claim 11, wherein:
a type of a segment, among the plurality of segments, is determined according to a property of a bitstream stored in the segment; and
wherein the performing the entropy decoding in parallel comprises performing entropy decoding in parallel on a number of bitstreams corresponding to a number of types of the plurality of segments in one cycle.

13. The method of claim 7, wherein the reading the first and the second bitstreams comprises, if the performing the entry decoding of the first bistream is completed by a first entropy decoding unit while the performing the entropy decoding of the second bitstream is not completed by a second entropy decoding unit, not reading a third bitstream to be entropy-decoded by the first entropy decoding unit until the second entropy decoding unit completes the performing the entropy decoding of the second bitstream.

14. The method of claim 7, wherein the performing the entropy decoding in parallel comprises, if the performing the entry decoding of the first bistream is completed by a first entropy decoding unit while the performing the entropy decoding of the second bitstream is not completed by a second entropy decoding unit, pausing the first entropy decoding unit such that a read third bitstream to be entropy-decoded by the first entropy decoding unit is not entropy decoded until the second entropy decoding unit completes the performing the entropy decoding of the second bitstream.

15. An entropy encoding apparatus comprising:
an entropy encoding performing unit which generates a plurality of bitstreams of data groups by performing entropy encoding on a plurality of symbols of the data groups; and
a bitstream storage unit which stores a first bitsream among the plurality of bitstreams in a first segment, among a plurality of divided segments of a storage unit according to a first property of the first bitstream, and which stores a second bitstream among the plurality of bitstreams in a second segment, among the plurality of divided segments, according to a second property of the second bitstream,
wherein the bitstream storage unit allocates the first and the second bitstreams of neighboring data groups in an encoding order of the data groups, to the first and the second segments,
wherein the plurality of bitstreams are stored such that the first bitstream and the second bitstream are stored in different segments, among the plurality of divided segments, when the first bitstream and the second bitstream are adjacent to each other according to the encoding order of the data groups,
wherein the first and the second segments are sequential in the plurality of divided segments, and
wherein if a length of the first bitstream is less than a length of the first segment, the bitstream storage unit allocates a third bitstream having the first property to the first segment from a point where the storing of the first bitstream is completed.

16. The apparatus of claim 15, further comprising:
a motion estimation unit which estimates motion between frames of input video data;
a motion compensation unit which performs inter prediction by using motion information between the frames;
an intra prediction unit which performs intra prediction by using information of neighboring pixels of one frame from among the frames; and
a transformation and quantization unit which performs frequency transformation and quantization on residual video data generated by performing prediction encoding,
wherein the plurality of symbols comprise a plurality of types of encoding information for controlling an encoding process, quantized coefficients of the residual video data of the data groups, and the motion information.

17. The apparatus of claim 16, wherein the input video data is high-definition video data or ultra-definition video data.

18. The apparatus of claim 16, wherein the encoding process is an H.264 encoding process.

19. An entropy decoding apparatus comprising:
a reception unit which receives a plurality of bitstreams of data groups, which are allocated to and stored in a plurality of segments of a storage unit;
a bitstream read unit which reads first and second bitstreams, of the plurality of bitstreams, stored in an orderly manner in first and second segments, respectively, of the plurality of segments according to first and second properties, respectively, of the first and the second bitstreams; and
an entropy decoding performing unit which performs entropy decoding in parallel on the read first and second bitstreams,
wherein the bitstream read unit reads the first and the second bitstreams of neighboring data groups in a decoding order of the data groups, from the first and the second segments,
wherein the first bitstream and the second bitstream are read from different segments, among the plurality of divided segments, when the first bitstream and the second bitstream are adjacent to each other according to the decoding order of the data groups,
wherein the bitstream read unit respectively reads the first and the second bitstreams that are sequential in the decoding order of the data groups, from the first and the second segments that are sequential in the plurality of segments, and
wherein the bitstream read unit, if a length of the first bitstream is less than a length of the first segment, reads a third bitstream having the first property, from the first segment at a point where the storing of the first bitstream is completed.

20. The apparatus of claim 19, wherein:
the entropy decoding performing unit generates symbols of the data groups, which comprise quantized coefficients of residual video data of the data groups, encoding information, and motion information, and wherein the entropy decoding apparatus further comprises:
an inverse quantization and inverse transformation unit which restores video data of the data groups by performing inverse quantization and inverse frequency transformation on the quantized coefficients of the residual video data of the data groups;
a motion compensation unit which performs inter prediction by using the motion information and the residual video data of the data groups;
an intra prediction unit which performs intra prediction on the video data of the data groups; and
a deblocking performing unit which restores original video data by performing deblocking filtering on the video data of the data groups and the video data on which the intra prediction and motion compensation are performed.

21. A non-transitory computer readable recording medium having recorded thereon a computer program for executing the method of claim 1.

22. A non-transitory computer readable recording medium having recorded thereon a computer program for executing the method of claim 7.

23. The method of claim 1, wherein the generating the plurality of bitstreams comprises generating the first bitstream and the second bitstream in parallel by performing parallel entropy encoding.

24. The method of claim 1, wherein the plurality of bitstreams are stored such that the first bitstream and the second bitstream are stored, regardless of throughput of entropy encoding, in different segments, among the plurality of divided segments, when the first bitstream and the second bitstream are adjacent to each other according to the encoding order of the data groups such that the first bitstream and the second bitstream included in the different segment are variable length entropy decoded in parallel by dividing each segment including the first bitstream and the second bitstream.

25. The method of claim 7, further comprising:
variable length entropy decoding the first bitstream and the second bitstream in parallel by reading each segment of the first bitstream and the second bitstream when the first bitstream and the second bitstream are adjacent to each other according to the decoding order of the data groups.

* * * * *